United States Patent
Ordaz

(10) Patent No.: US 10,239,259 B2
(45) Date of Patent: Mar. 26, 2019

(54) CUSTOM INSOLE

(71) Applicant: Ivan Ordaz, Miami Lakes, FL (US)

(72) Inventor: Ivan Ordaz, Miami Lakes, FL (US)

(*) Notice: Subject to any disclaimer, the term of this patent is extended or adjusted under 35 U.S.C. 154(b) by 13 days.

(21) Appl. No.: 15/652,462

(22) Filed: Jul. 18, 2017

(65) Prior Publication Data

US 2019/0022945 A1 Jan. 24, 2019

(51) Int. Cl.
| | |
|---|---|
| *G06F 19/00* | (2018.01) |
| *B29C 64/393* | (2017.01) |
| *A43B 17/00* | (2006.01) |
| *B29D 35/12* | (2010.01) |
| *B33Y 50/02* | (2015.01) |
| *B33Y 80/00* | (2015.01) |
| *B33Y 10/00* | (2015.01) |

(52) U.S. Cl.
CPC ............ *B29C 64/393* (2017.08); *A43B 17/00* (2013.01); *B29D 35/122* (2013.01); *B33Y 10/00* (2014.12); *B33Y 50/02* (2014.12); *B33Y 80/00* (2014.12)

(58) Field of Classification Search
CPC ......... B33Y 80/00; B33Y 10/00; B33Y 30/00; B33Y 50/02; B33Y 50/00; A43B 3/0005; A43B 17/00; A43B 13/04; A43B 13/183; A43B 17/02; A43B 17/14; A43B 13/141; A43B 13/16; A43B 23/027; A43B 23/0295; A43B 23/047; A43B 3/26; A43B 7/24; A43B 7/141; A43B 17/006
See application file for complete search history.

(56) References Cited

U.S. PATENT DOCUMENTS

| | | | | | |
|---|---|---|---|---|---|
| 6,141,889 | A | * | 11/2000 | Baum ................. | A43B 13/223 12/146 M |
| 6,205,230 | B1 | * | 3/2001 | Sundman ............ | A61B 5/0064 382/100 |
| 7,399,888 | B2 | * | 7/2008 | Rahman ............... | C07C 45/004 568/377 |
| 2006/0076700 | A1 | * | 4/2006 | Phillips .................... | A43B 7/28 264/40.1 |
| 2006/0247892 | A1 | * | 11/2006 | Peterson ................. | A43D 1/02 702/167 |
| 2006/0283243 | A1 | * | 12/2006 | Peterson ............. | A61B 5/1036 73/172 |
| 2007/0043582 | A1 | * | 2/2007 | Peveto ..................... | A43B 3/26 705/1.1 |
| 2014/0276094 | A1 | * | 9/2014 | Lidtke .................. | A61B 5/1079 600/476 |
| 2015/0032242 | A1 | * | 1/2015 | Schouwenburg ....... | G06F 19/12 700/98 |
| 2016/0110479 | A1 | * | 4/2016 | Li .......................... | G06F 3/0484 703/1 |
| 2016/0249807 | A1 | * | 9/2016 | Mougin ............... | A61B 5/0064 600/407 |

(Continued)

*Primary Examiner* — Kidest Bahta
(74) *Attorney, Agent, or Firm* — Christopher J. VanDam PA; Chris Vandam

(57) ABSTRACT

A custom insole and process for fabrication comprised of scanning to map a foot, sending the scan to a remote processing computer and returning a 3D compatible printable file that can render the custom insole in a short time. The foot is preferably not deformed by standing pressure during the scan. The podiatrist taking the scan can amend the electronic file to add or remove material from the yet-to-be-made custom insole to tailor the fit to the specific patient.

8 Claims, 2 Drawing Sheets

(56) References Cited

U.S. PATENT DOCUMENTS

2016/0331071 A1\* 11/2016 Kane ...................... A43B 17/00
2017/0017230 A1\* 1/2017 Spector ................. A43B 17/00
2017/0190121 A1\* 7/2017 Aggarwal ............. G06T 15/205

\* cited by examiner

CUSTOM INSOLE

BACKGROUND OF THE INVENTION

1. Field of the Invention

The present invention relates to footwear insoles, and more particularly, to an insole customized to a specific patient for insertion into a shoe.

2. Description of the Related Art

Several designs for creating custom insoles for shoes have been designed in the past. None of them, however, includes a process for scanning the foot of the patient in the podiatrist's office, allowing the podiatrist to customize the to-be-built insole, sending the amended scan electronically to a remote server for processing into a 3D printable file, returning the 3D printable file to the podiatrist's office or other third party prover to physically render the custom insole and delivering the insole to the patient.

Applicant believes that the closest reference corresponds to technology currently in use in podiatry offices that take an impression of the foot or require the patient to stand on a pressure sensing pad to develop a custom foot orthotic. The pattern is then sent to a fabricator and the orthotic is delivered to the patient on a subsequent visit to the podiatrist's office.

However, it differs from the present invention because the prior art generally requires the patient to stand on the affected foot while the impression or measuring is taken. This can exacerbate any irregularities or abnormalities of the foot. By avoiding pressure on the foot during the presently described scan a truer and more natural mapping of the foot is possible.

Further, the prior art utilizes cumbersome technology that is not suitable for use in the podiatry office. For example, common prior art procedure has been to send an impression of the foot to a lab where an orthotic is carved from a block of material, sometime with the aid of a computer numerically controlled (CNC) router or carving tools.

These CNC machines require expert setup, are noisy, dangerous and can be difficult to maintain. Because of these characteristics the orthotic is made outside of the podiatrist's office and therefore requires delays and costs related to shipping the orthotic to the podiatrist's office and multiple patient visits.

Still further, the present process and method can be used with multi-material printers. This can combine materials that have beneficial characteristics such as rigidity, flexibility, sponginess, durability, with materials of differing characteristics to achieve a previously impossible insole made right in the podiatrist's office while the patient waits for the custom insole.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a custom insole right in the podiatrist's office while the patient waits in only one visit.

It is another object of this invention to provide a custom insole using scanning technology that maps a foot without deformities induced while bearing load on that foot.

It is still another object of the present invention to provide a device and method to fabricate multi-material custom insoles with high resolution and intricate detail.

Another object of the invention is to maintain the computing power of converting the imaging or mapping of the foot prior to fabricating the insole to a renderable format at a managed location that can be updated and improved without the need for expensive hardware or periodic upgrades to the equipment stationed at the podiatrist's office or other third party fabricator.

It is yet another object of this invention to provide such a device and process that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
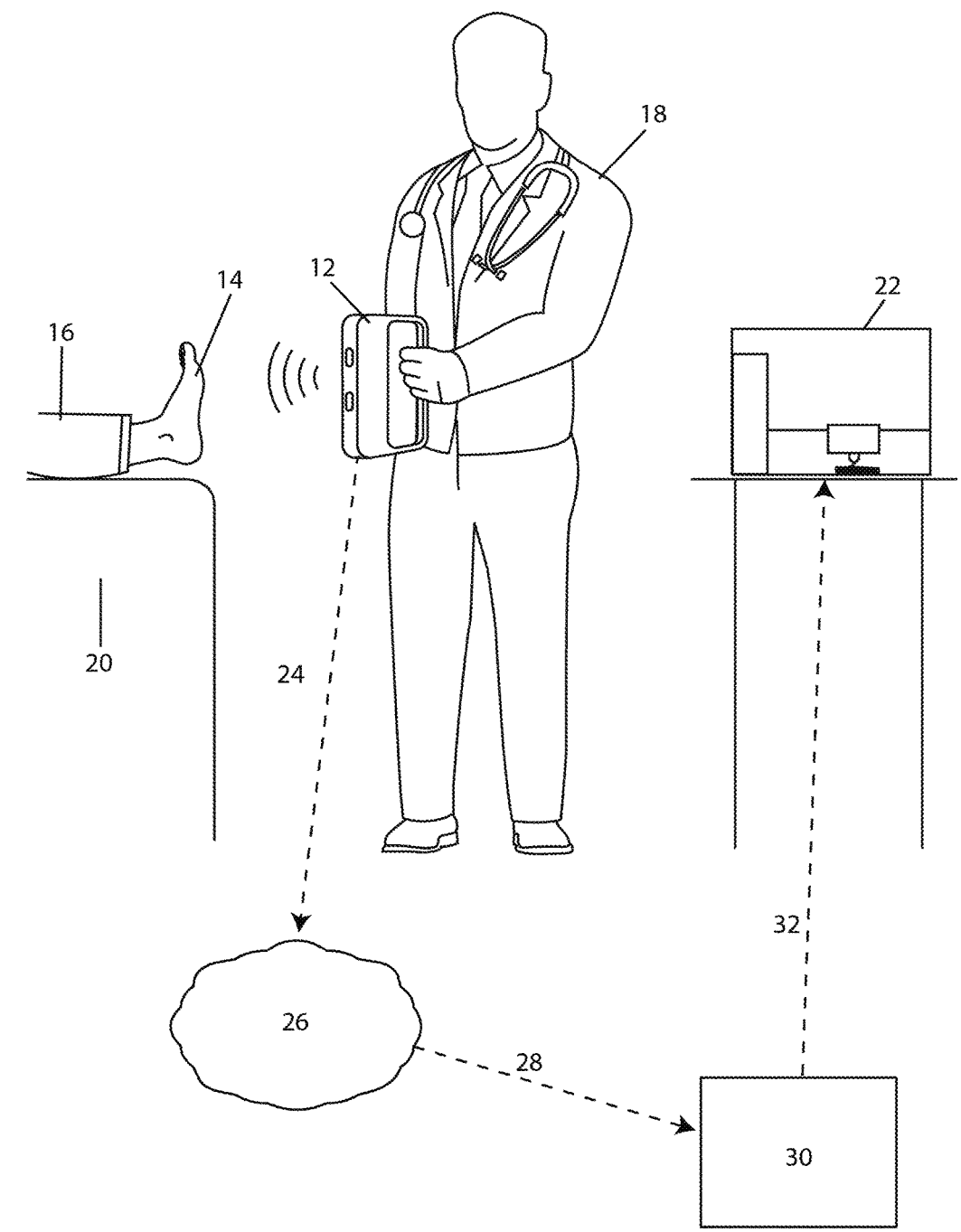
FIG. 1 shows a stylized process view of the actions in the podiatrist's office and the flow of data to an external processor and back to the podiatrist for rendering.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and process is sometimes referred to as the device, the invention, the system, the custom insole, the insole, the process, the method, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the contextual situation.

The term podiatrist, doctor, professional, technician and similar terms are interchangeable in that each could play a role in using the machine and process for the intended result. The nature of these terms does not affect the inventive quality of the process and method and are used to indicate that a person may have some role in the operation of the several component aspects of the invention.

Insoles for use in shoes can have many benefits to the user. For example, insoles can provide cushioning, arch support, correction of some foot conditions and generally improve comfort of a shoe. Several manufacturers offer insoles in an array of configuration and sizes, typically sold at pharmacies and other outlets. For some people, a suitable solution can be had off-the-rack at a retailer.

However, for improved performance and the ability to provide a medical benefit, many people benefit from a truly customized insole made specifically for that person. By measuring the actual foot that will be using the insole, an insole perfect for that person and their individual condition can be achieved.

Referring now to the drawings, where a version of the present invention is generally referred to with numeral 10, it can be observed that it basically includes a scanner 12, a foot 14, a patient 16, a doctor 18, a table 20, a 3D printer 22, a path 24, an internet 26, a path 28, a processor 30 and a path 32.

A patient 16 may seek a doctor 18 for treatment of their foot 14 or related issues. The doctor 18 will generally perform an examination of the patient to determine the appropriate course of treatment. In some cases, the doctor 18 prescribes a custom insole for the patient to alleviate any symptoms by use of a custom insole.

One failing of the prior art for customized insoles is that the foot is measured while weight bearing. This can capture an irregularity in foot anatomy, geometry or physiology that then can contaminate the fabrication of a custom insole. In the past, there has been no other method that can precisely measure the various aspects of an individual human foot without pressure on the foot causing inherent deformations that will inevitably be telegraphed to the resulting insole.

To solve this problem the patient 16 is asked by the doctor 18 to alleviate pressure on the foot 14 by either sitting in a chair or on an exam table 20. With the patient 16 relaxed the doctor 18 uses a scanner 12 to map the patient's foot 14. A high resolution scan will capture in high detail the foot 14.

In an important embodiment of the system the scanner 12 is an optical scanner that captures an image of the foot 12 with light, similar to a camera capturing an image. A single image or multiple images may be stitched together and used to get an accurate and complete map of the patient's foot 14.

Other technologies may equally be employed to map the patient's foot 14. For example, laser surface mapping or ultrasound technology can be used and is readily available to the medical markets. Cost, technical experience necessary, speed, accuracy and completeness of the mapping can dictate a preferred method. By however means the foot 14 is mapped the same result can be achieved.

Once the image or other mapping is captured is sent from the doctor 12 via the internet 26 via path 24. This is merely an enabling example. Other means and methods of transmitting the foot 14 map data could be used. The term internet 26 means any digital transmission and path 24 or 28 is illustrative of sending data from one computer to another.

In a version of the invention the mapping data collected by the doctor 18 with her scanner 12 is sent to the internet 26 by network path 24 and then by network path 28 to a managed processor 30. The processor 30 receives the mapping data from the doctor 18 with or without the doctor's customizing amendments.

The processor 30 then computes the mapping data and formulates a dataset prepared to be compatible with a preselected 3D rendering device, such as a 3D printer 22. In one version of the invention when the processor 30 is remote from the doctor 18 it can be maintained by a provider of the service. This can be significant for updating the processor 30 and minimizing the computing power and hardware required in the doctor's 18 office.

The doctor's office needs then to only maintain the scanner 12 and 3D printer 22 but not the computer and software for processing the scanner 12 obtained data into a data set suitable for rendering physically on the 3D printer 22 (or other rendering device).

Having the server 30 maintained remotely can also benefit the doctor 18 and patient 16 by having continual upgrades to the processor 30 that can be immediately implemented across all doctor offices participating in the present custom insole system. Further this can allow the scanner 12 and 3D printer 22 hardware to be updated or replaced easily without affecting the computing power applied to the processing of the mapping data when creating the 3D printable file.

Once the server 30 has generated the 3D renderable file in a format compatible with the specific 3D printer 22 used by the doctor 18 that file is sent via electronic path 32 using the internet 26 or other electronic transmission means.

When the 3D printer 22 receives the data from the server 30 the doctor 18 (or other technician in the doctor's office) ensures that the 3D printer 22 is properly functioning and creates the custom insole as intended. When completed the custom insole is delivered to the patient 16 for final fitting and use.

The time to take the image of the patient's foot 14, deliver the imaging data to the processor 30 and return to the printer 22 for rendering can take a short amount of time. A limiting factor can be the time needed to render the insole on the printer 22 which can cause the entire process to take from a few minutes to a couple of hours. Thus the patient 16 can wait or return the same day to retrieve the customized insole and the relief it provides.

Figure 2:
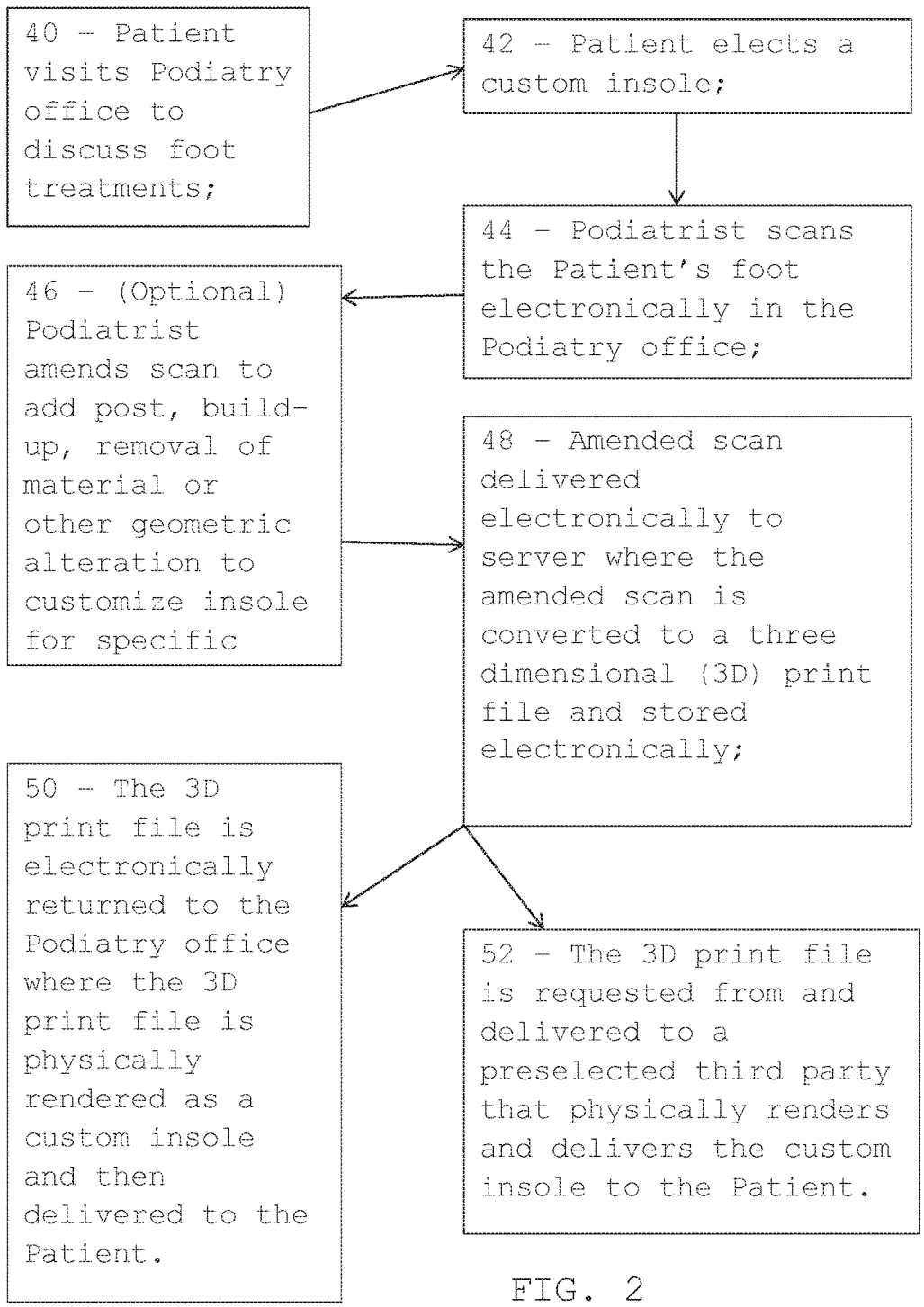
FIG. 2 shows a flow chart of an example of the custom insole fabrication process.

FIG. 2 shows an example of how the process and machines used for creating a custom insole are configured in a real-world example. At the beginning in step 40 the patient visits the podiatrist to be examined and discuss option for foot treatments. The patient in step 42 elects to proceed with a custom insole provided by that podiatry office.

The podiatrist (or a staff member) scans the patient's foot in step 44 while they are not bearing weight on that foot. This gives a truer foot geometry perspective from which to best fabricate a custom insole. After the scan the podiatrist has an opportunity to make changes and amendments to the proposed insole. For example, the podiatrist may increase an arch, add a post, add a corrective build-up or any other features that the podiatrist deems beneficial to the patient.

In step 48 the finalized image with other podiatrist added information is sent electronically to a server or processor computer. This computer analyzes and converts the digital info from the podiatrist to a format compatible with the 3D printer located in the podiatrist's office or other location.

The electronic file that has been prepared by the remote server/processor is returned to the podiatrist's office in step 50. At the podiatrist's office the file is delivered to the 3D printer where it physically creates the custom insole. In minutes, the insole is available for final fit testing delivery and delivery to the patient. If adjustments are needed, the podiatrist may make minor changes in the office, for example, grinding away sharp edges or may resubmit the image file with further amendments to the server for reprocessing into a new 3D printable file that is then remade on the 3D printer at the podiatrist's office.

As an alternative to requiring the insole to be made at the podiatrist's office, the insole may be made at a third party printing service, as demonstrated in alternate step 52. This can be useful in the instance where the podiatrist does not have a suitable, functioning 3D printer. Similarly, when a former insole wears out or breaks and new imaging is not required then another entity can create another new custom insole similar to the one previously made. This scenario is similar to how eye glasses are distributed in that once a prescription has been made, the patient can get any number of pairs of glasses during the validity term of the prescription eye glass exam.

This third party rendering of custom insoles can have other beneficial implications for underserved populations. Rural patients can have custom insoles made at a location remote from the podiatrist and convenient to them. Or, any patient may find it convenient to have a service periodically mail them a fresh, newly made set of insoles without the burden and costs of revisiting the podiatrist.

The terms and concepts for a scanner may also include more than only optical sensing devices to map the foot of the patient. Other technologies fall within the inventive concepts, for example ultrasound, scanning at other wavelengths in the electromagnetic spectrum or acoustic, pressure and/or frequency wave spectrum.

Similar, the use of the term 3D printer is intended to include other technologies capable of receiving a digital input and with a computer and a tool recreate or render a physical article. For example, a computer numerically controlled (CNC) router, thin layer deposition printer, polymer printer, extruders, carvers, additive manufacturing, lithography, fused deposition, laminations, beam melting, digital light processing or other similar technologies.

An important version of the inventive concept can be fairly described as a method of fabricating a custom insole comprising the steps of having a patient positioned so that a subject foot is not bearing weight to avoid deformities. The subject foot is mapped by scanning resulting in a first electronic file. The scanning is any of optical, laser, ultrasound, scanning at other wavelengths in the electromagnetic spectrum or acoustic, pressure and/or frequency wave spectrum. A professional, such as a podiatrist, amends the first electronic file to further tailor the custom insole to the specific nature of the subject foot, correcting any issues by adding or subtracting material from the new custom insole. Then the first electronic file is sent to a remote computer. The remote computer receives and processes the first electronic file thereby creating a second electronic file adapted for three dimensional rendering on a preselected three dimensional printing device. The remote computer can be continually upgraded and improved at one location instead of updating each user station thereby producing the most up to date 3D render files and rendering technology. The second electronic file is sent to the preselected three dimensional printing device, whether at the podiatrist's office or at another location. The three dimensional printing device receives the second electronic file and physically renders the custom insole where it can be delivered to the patient.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method of fabricating a custom insole comprising:
a patient is positioned so that a subject foot is suspended without touching any other object and not bearing any pressure of the patient's weight;
the subject foot is mapped by scanning without physically contacting the scanning device resulting in a first electronic file;
the first electronic file is processed thereby creating a second electronic file adapted for three dimensional rendering on a preselected three dimensional printing device;
the second electronic file is sent to the preselected three dimensional printing device;
the three dimensional printing device receives the second electronic file and physically renders the custom insole.

2. The method as in claim 1 further characterized in that the scanning is any of optical, laser, ultrasound, scanning at other wavelengths in the electromagnetic spectrum or acoustic and/or frequency wave spectrum.

3. The method as in claim 1 further characterized in that a professional amends the first electronic file prior to sending to the remote computer to further tailor the custom insole to the specific nature of the subject foot.

4. A method of fabricating a custom insole comprising:
a patient is positioned so that a subject foot is suspended without touching any other object and not bearing any pressure of the patient's weight;
the subject foot is mapped by scanning without physically contacting the scanning device resulting in a first electronic file;
the scanning is any of optical, laser, ultrasound, scanning at other wavelengths in the electromagnetic spectrum or acoustic and/or frequency wave spectrum;
a professional amends the first electronic file to further tailor the custom insole to the specific nature of the subject foot;
then the first electronic file is processed thereby creating a second electronic file adapted for three dimensional rendering on a preselected three dimensional printing device;
the second electronic file is sent to the preselected three dimensional printing device;
the three dimensional printing device receives the second electronic file and physically renders the custom insole.

5. An insole fabricated by the method in claim 1.
6. An insole fabricated by the method in claim 2.
7. An insole fabricated by the method in claim 3.
8. An insole fabricated by the method in claim 4.

* * * * *